(12) United States Patent
Graham

(10) Patent No.: US 6,854,788 B1
(45) Date of Patent: Feb. 15, 2005

(54) DEVICE FOR REDUCING VEHICLE AERODYNAMIC RESISTANCE

(75) Inventor: Sean C. Graham, Seattle, WA (US)

(73) Assignee: Freight Wing Inc., Sammamish, WA (US)

( * ) Notice: Subject to any disclaimer, the term of this patent is extended or adjusted under 35 U.S.C. 154(b) by 0 days.

(21) Appl. No.: 10/698,998

(22) Filed: Nov. 3, 2003

(51) Int. Cl.$^7$ ............................................. B62D 35/00
(52) U.S. Cl. .............................. 296/180.4; 296/180.1; 296/180.5
(58) Field of Search .......................... 296/180.1, 180.4, 296/180.5, 180.2, 180.3, 181.5; 180/903; 105/1.3

(56) References Cited

U.S. PATENT DOCUMENTS

| | | | | |
|---|---|---|---|---|
| 3,960,402 A | 6/1976 | Keck | ............................. | 296/1 S |
| 4,214,787 A | 7/1980 | Chain | ............................. | 296/1 S |
| 4,236,745 A | * 12/1980 | Davis | ............................. | 296/180.4 |
| 4,257,641 A | 3/1981 | Keedy | ............................. | 296/1 S |
| 4,458,936 A | 7/1984 | Mulholland | ................. | 296/1 S |
| 4,601,508 A | 7/1986 | Kerian | ............................ | 296/1 S |
| 4,741,569 A | * 5/1988 | Sutphen | .................... | 296/180.4 |
| 4,818,015 A | 4/1989 | Scanlon | ..................... | 296/180.1 |
| 5,332,280 A | 7/1994 | DuPont | ....................... | 296/180.1 |
| 5,375,903 A | 12/1994 | Lechner | ...................... | 296/180.1 |
| 5,498,059 A | 3/1996 | Switlik | ...................... | 296/180.1 |
| 6,257,654 B1 | * 7/2001 | Boivin et al. | ............. | 296/180.5 |
| 6,409,252 B1 | 6/2002 | Andrus | ....................... | 296/180.4 |
| 6,457,766 B1 | 10/2002 | Telnack | .................... | 296/180.1 |
| 6,467,833 B1 | * 10/2002 | Travers | .................... | 296/180.4 |
| 6,485,087 B1 | * 11/2002 | Roberge et al. | .......... | 296/180.5 |
| 6,595,578 B1 | 7/2003 | Calsoyds et al. | ........ | 296/180.4 |
| 6,666,498 B1 | * 12/2003 | Whitten | .................... | 296/180.4 |
| 6,742,616 B2 | * 6/2004 | Leban | ......................... | 180/116 |
| 2003/0227194 A1 | * 12/2003 | Farlow et al. | ............ | 296/180.4 |

* cited by examiner

*Primary Examiner*—Stephen Gordon

(57) ABSTRACT

A device for a vehicle with a pair of swinging rear doors, which converts flat sheets of pliable material hinged to the sides of the vehicle adjacent the rear thereof into effective curved airfoils that reduce the aerodynamic resistance of the vehicle, when the doors are closed by hand, utilizing a plurality of stiffeners disposed generally parallel to the doors and affixed to the sheets and a plurality of collapsible tension bearings struts attached to each stiffener and the adjacent door.

11 Claims, 5 Drawing Sheets

DEVICE FOR REDUCING VEHICLE AERODYNAMIC RESISTANCE

This invention was made with Government support under Contract No. DE-FC36-03G013173 awarded by the Department of Energy. The Government has certain rights in this invention.

TECHNICAL FIELD

The invention relates to a device for reducing the aerodynamic resistance of a moving vehicle and more particularly to a pair of curved airfoils that are formed when the rear doors of the vehicle are closed.

BACKGROUND ART

It is well known that streamlining the back of a vehicle such as a trailer truck will reduce the aerodynamic resistance of a moving vehicle and thus save fuel. However, attaching streamlining devices to the rear of the truck inhibits opening the rear doors. To open the rear doors the driver had to either detach, unlatch, fold, deflate or activate hydraulic, pneumatic, electric or spring assist devices or perform any combination thereof before or while opening the rear doors. The device described herein becomes a pair of highly aerodynamic curved airfoils when the doors are closed and moves flush against the sides of the truck when the doors are opened. The driver simply opens or closes the doors to change flat sheets into curved airfoils without the use of any hydraulic, pneumatic, electrical or spring assist eliminating the initial cost, maintenance expenses, and weight related of such assist devices.

DISCLOSURE OF THE INVENTION

In general, a device for reducing vehicle aerodynamic resistance disposed on the rear of a movable vehicle with a generally flat rear end and a pair of swinging rear doors, when made in accordance with this invention, comprises a pair of airfoils swingably attached to opposite sides of the vehicle adjacent the rear end of the vehicle. The airfoils are made of flat sheets of pliable material and have stiffening members affixed to the sheets. The stiffening members are disposed generally parallel to the rear end of the vehicle. A plurality of collapsible, tension bearing struts are attached to the stiffening members and to the adjacent rear door. The struts have a predetermined length. So that when the rear doors are closed the sheets bend into effective curved airfoil shapes reducing the aerodynamic resistance of the moving vehicle and when the rear doors are opened the sheets flatten out between the sides of the vehicle and the doors allowing the doors to swing into an open position generally parallel to the sides of the vehicle.

BRIEF DESCRIPTION OF THE DRAWINGS

The invention as set forth in the claims will become more apparent by reading the following detailed description in conjunction with the accompanying drawings, wherein like reference numerals refer to like parts throughout the drawings and in which:

BEST MODE FOR CARRYING OUT THE INVENTION

Figure 1:
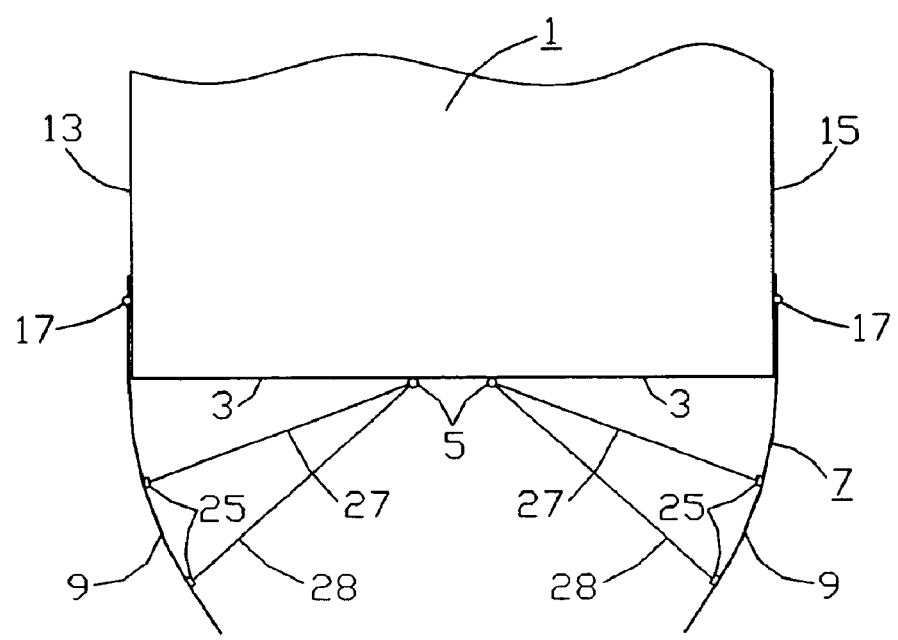
FIG. 1 is a plan view of a vehicle with the rear doors closed and the sheets bent to form effective curved airfoils.
Figure 2:
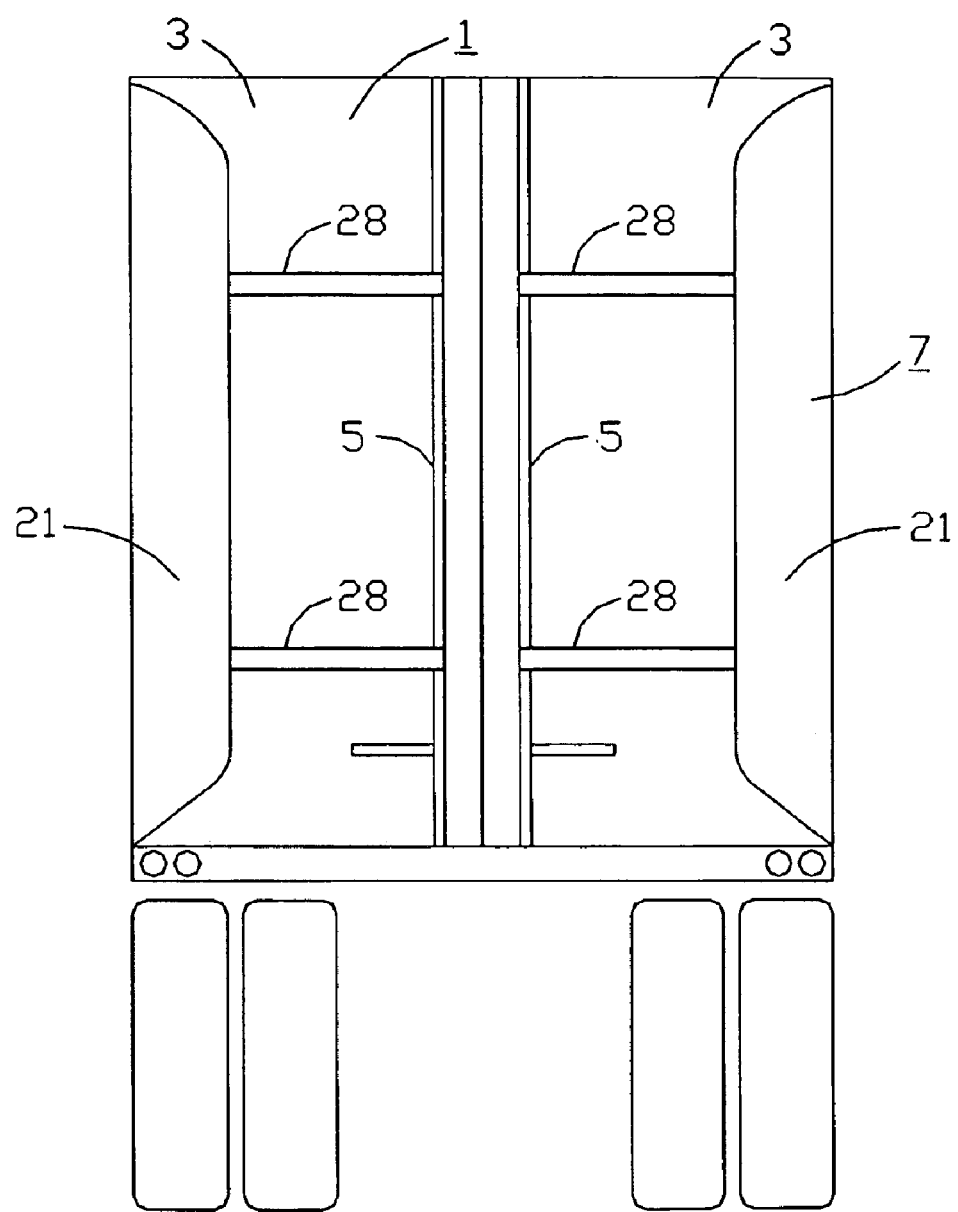
FIG. 2 is a rear elevational view of a vehicle with the rear doors closed and the sheets bent to form effective curved airfoils.
Figure 3:
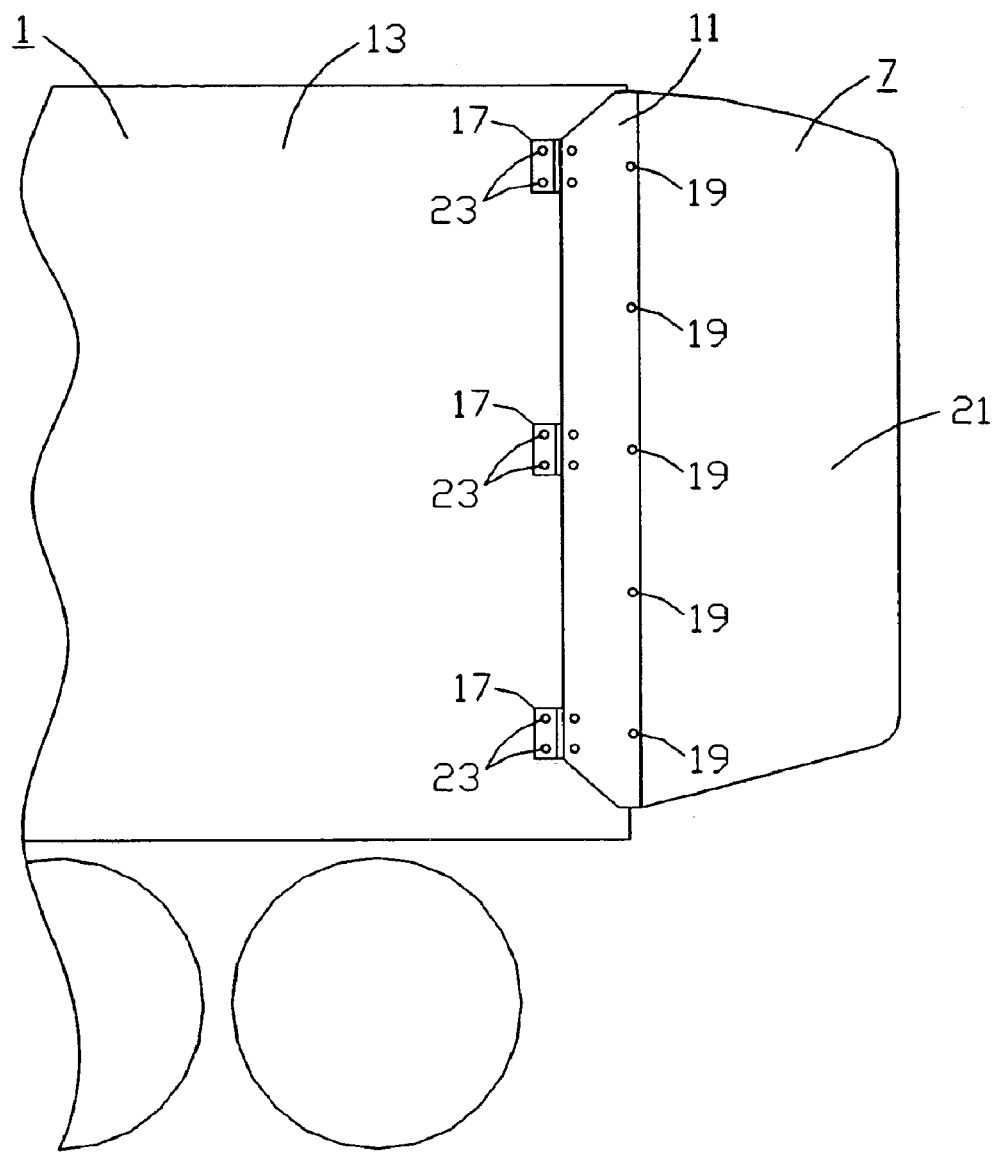
FIG. 3 is a side elevational view of a vehicle with the rear doors closed and the sheets bent to form effective curved airfoils.
Figure 4:
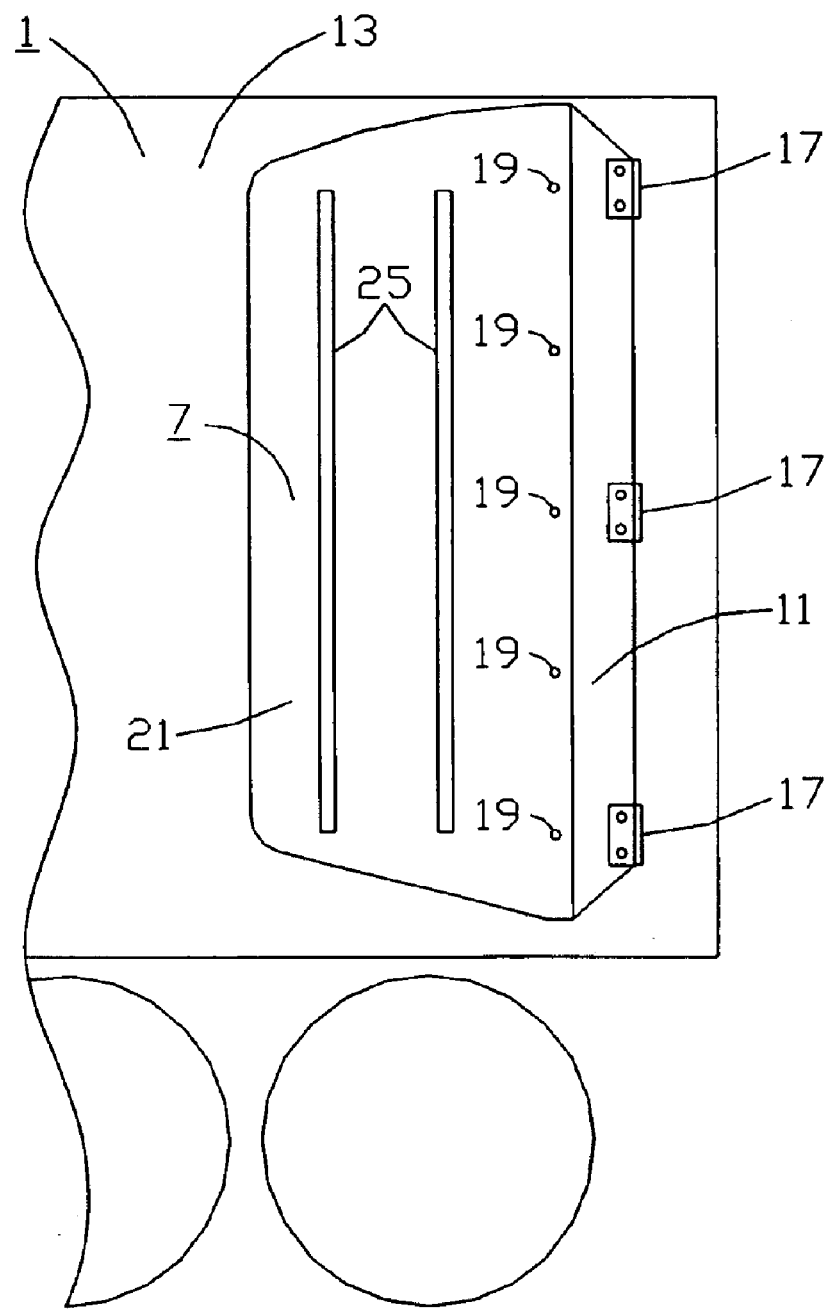
FIG. 4. is a side elevational view of a vehicle with the flattened sheets installed on the side of the vehicle.
Figure 5:
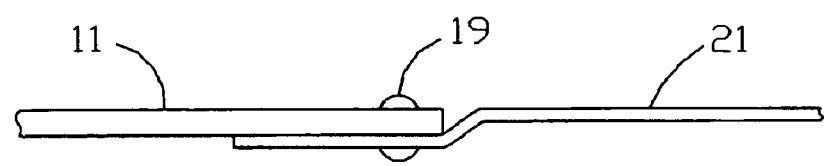
FIG. 5 is an enlarged partial view of the flat sheets showing how they are joined and FIG. 6 is a plan view of a vehicle having a rolling rear door and additional rear swinging doors.

Referring now to the drawings in detail and in particular to FIG. 1, there is shown a rear portion of a vehicle 1, such as a trailer truck, having a pair of closed swinging doors 3 with latching bars 5 and a device 7 for reducing the aerodynamic resistance of the vehicle 1 when it moves.

FIGS. 1, 2, 3 and 5 show the device 7 comprises a pair of airfoils 9, each of which is made up of a first flat sheet 11 of a light weight material, such as aluminum, swingably attached to opposite sides 13 and 15 of the vehicle 1 by hinges 17, which are fastened to the sides 13 and 15 by rivets 23, welding or other fastening means. A second flat sheet 21 of light weight material, such as aluminum, is affixed to the first sheet 11 by rivets 19 or other fastening means. The second sheet 21 is thinner and more pliable than the first sheet 11, thus, bending stresses produced therein when a bending force is applied to form the airfoil are well within the elastic limit of the material so that when the bending force is removed the second sheet 21 returns to its original flat state. A plurality of stiffening members or stiffeners 25, such as flat bars, angles or channels, preferably made of aluminum, are affixed to the second sheet 21 by welding, rivets or other fastening means. The stiffening members 25 are disposed generally parallel to the flat back of the vehicle 1. While two stiffening members 25 are shown affixed to each second sheet 21, it is understood that any number of stiffening members may be utilized. A plurality of collapsible tension bearing struts 27 or 28 are attached to each stiffening member 25 and to the adjacent door 3. The length of the struts 28 attaching the outer stiffening members 25 to the adjacent door 3 are longer than the struts 27 attaching the inner stiffening members 25 to the adjacent door 3 to form an effective curved airfoil 9. While only two struts 27 or 28 are shown attaching each stiffening member 25 to the adjacent door 3 it is understood that any number of struts 27 or 28 may be utilized.

Figure 6:
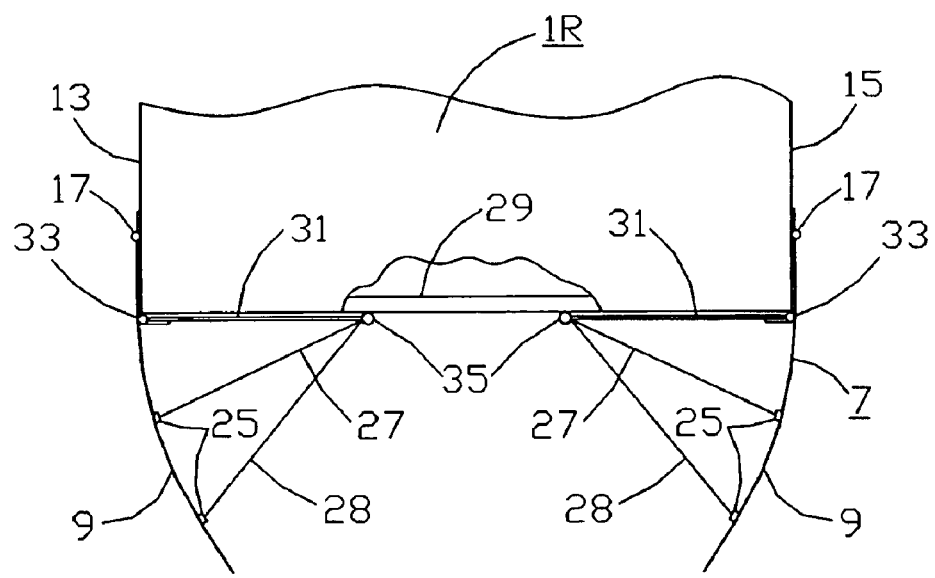

FIG. 6 shows a vehicle 1R with a rolling rear door 29 and a pair of added swinging doors 31 with hinges 33 attaching the added swinging doors to the rear of the vehicle 1R and latching mechanisms 35 for latching the doors to the rear of the vehicle 1R. The swing doors 31 need not extend all the way across the rear of the vehicle and may be made of structural members such as angles, channels or tubing or of plate or any combination thereof and function to operate the device 7 in the same manner as the doors 3.

The operation of the device 7 is simple when the pair of doors 3 or 31 are open, the flat sheets 11 and 21 are disposed flat against the sides 13 and 15 of the vehicle 1 or 1R. As the driver begins to swing one of the doors 3 or 31 to its closed position, the collapsible struts 27 or 28 straighten out and the sheets 11 and 21 begin to swing on the hinges 17 with the door 3 or 31. As the door 3 or 31 continues to swing closed the first flat plate 11 contacts the side 13 or 15 of the vehicle 1 or 1R and as the door 3 or 31 continues to close the second flat sheet 21 pulled by the collapsible struts 27 or 28 begins to bend. When the door 3 or 31 reaches its closed position the second flat sheet 21 is bent to form an effective curved airfoil. The door 3 or 31 is then latched in the closed position. The second sheet 21 is pliable and the bending stresses are well within the elastic limit, allowing the driver to close the door easily. The other door 3 or 31 of the pair is closed and latched in the same way completing the pair of curved airfoils 9, which will reduce the aerodynamic resistance of the moving vehicle 1 or 1R.

As the driver unlatches and opens either of the doors 3 or 31 the tension in the collapsible struts 27 or 28 is reduced and the second sheet 21 begins to flatten out. As the door 3 continues to open the second sheet 21 flattens out completely and swings with the first sheet 11 and the door 3 to its fully open position next to the side 13 or 15 of the vehicle 1 or 1R.

While the preferred embodiments described herein set forth the best mode to practice this invention presently contemplated by the inventor, numerous modifications and adaptations of this invention will be apparent to others of ordinary skill in the art. Therefore, the embodiments are to be considered as illustrative and exemplary and it is understood that the claims are intended to cover such modifications and adaptations as they are considered to be within the spirit and scope of this invention.

INDUSTRIAL APPLICABILITY

An aerodynamic reducing device 7 for a vehicle 1 or 1R as set forth in this invention provide a device 7, which is economical to manufacture and to maintain, and is easily hand operated by the driver of the vehicle 1 or 1R without hydraulic, pneumatic, electric or spring mechanisms. It provides a pair of curved airfoils that will substantially reduce the aerodynamic resistance of the moving vehicle 1 or 1R, thus reducing fuel consumption, fuel cost and air pollution. Because the sheets 21 forming the airfoils are pliable they offer very little resistance, if the vehicle 1 or 1R is struck from the rear.

What is claimed is:

1. A device for reducing vehicle aerodynamic resistance disposed on the rear end of a vehicle, having a pair of swinging rear doors, the device comprising: a pair of airfoils swingably attached to opposite sides of the vehicle adjacent the rear end thereof; the airfoils being made of flat sheets of pliable material and having collapsible tension bearing struts attached to the sheets and to the rear doors; the struts having a predetermined length; whereby when the doors are closed the sheets bend into an effective curved airfoil shape reducing the aerodynamic resistance of the vehicle when moving and when the doors are opened the sheets flatten out between the sides of the vehicle and the doors allowing the doors to swing into an open position generally parallel to the sides of the vehicle.

2. A device as set forth in claim 1, wherein the airfoils are swingably attached to the sides of the vehicle by a plurality of hinges forward of the rear end of the vehicle.

3. A device as set forth in claim 1, wherein there is at least one stiffening member affixed to each flat sheet and disposed generally parallel to the rear end of the vehicle.

4. A device as set forth in claim 2, wherein each flat sheet comprises a first flat sheet attached to the sheet hinges and a second flat sheet affixed to the first flat sheet, the first flat sheet being thicker and less pliable than the second flat sheet.

5. A device as set forth in claim 4, wherein there is at least one stiffening member affixed to the second flat sheet and disposed generally parallel to the rear end of the vehicle.

6. A device as set forth in claim 1, wherein the collapsible tension bearing struts are straps of synthetic fiber webbing.

7. A device as set forth in claim 5, wherein the collapsible tension bearing struts are straps of synthetic fiber webbing.

8. A device as set forth in claim 1, wherein the flat sheets are made of aluminum.

9. A device as set forth in claim 5, wherein the first flat sheet and second flat sheet are made of aluminum and the second flat sheet is sufficiently pliable to offer minimal resistance, if the vehicle is struck in the rear.

10. A device as set forth in claim 9, wherein the first flat sheet and second flat sheet are riveted together.

11. A device for reducing vehicle aerodynamic resistance disposed on the rear end of a movable vehicle, having a pair of swinging rear doors, the device comprising: a pair of airfoils swingably attached to opposite sides of the vehicle adjacent the rear of the vehicle; the airfoils each being made of a first flat sheet of aluminum and a second flat sheet of aluminum; the second flat sheet having a plurality of stiffening members affixed thereto and disposed generally parallel to the rear end of the vehicle and being thinner and more pliable than the first flat sheet; and a plurality of collapsible tension bearing struts attached to the stiffening members and to the swinging rear doors; the struts having predetermined lengths; whereby when the doors are closed the second sheets bend into effective curved airfoil shapes reducing the aerodynamic resistance of the vehicle when moving and when the doors are opened the second sheets flatten out between the sides of the vehicle and the doors allowing the doors to swing into an open position generally parallel to the sides of the vehicle.

* * * * *